United States Patent

[11] 3,631,977

| | | |
|---|---|---|
| [72] | Inventor | Everett G. Taul<br>Birmingham, Ala. |
| [21] | Appl. No. | 859,360 |
| [22] | Filed | Sept. 19, 1969 |
| [45] | Patented | Jan. 4, 1972 |
| [73] | Assignee | Bush Manufacturing Company<br>Trussville, Ala. |

[54] LUMBER SORTER
5 Claims, 7 Drawing Figs.

[52] U.S. Cl................................................. 209/80, 209/82
[51] Int. Cl..................................................... B07c 5/04
[50] Field of Search........................................ 209/82, 80, 111.7, 75, 90, 88, 74

[56] References Cited
UNITED STATES PATENTS

| 2,762,508 | 9/1956 | Parton.......................... | 209/90 |
| 3,249,223 | 5/1966 | Johnson et al................. | 209/88 |
| 3,085,686 | 4/1963 | Hanbury....................... | 209/82 |
| 3,116,835 | 1/1964 | Brandon....................... | 209/90 |

Primary Examiner—Richard A. Schacher
Assistant Examiner—Gene A. Church
Attorney—Newton, Hopkins & Ormsby ABSTRACT: A lumber-sorting system including a conveying mechanism, lumber ejector means, and sensing means associated with the ejector means to cause the ejector means to selectively discharge lumber carried by the conveying mechanism therefrom. The sensing means and ejector means are adjustable so that the lumber may be sorted according to length, width, thickness, or any combination thereof and the sensing means is electromagnetically connected to the ejector means for activating same.

INVENTOR
EVERETT G. TAUL
BY: Newton, Hopkins, & Ormsby
ATTORNEYS

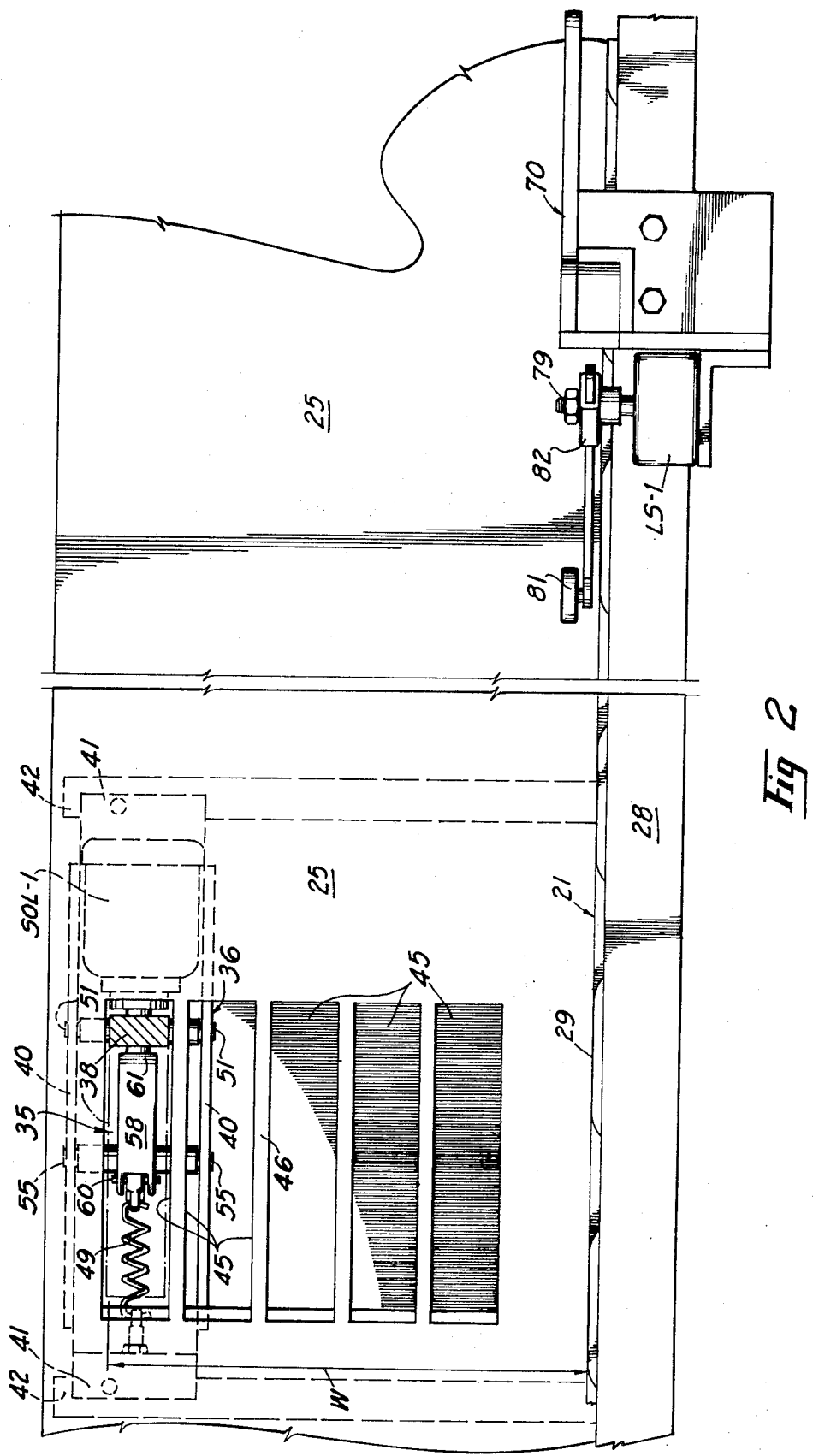

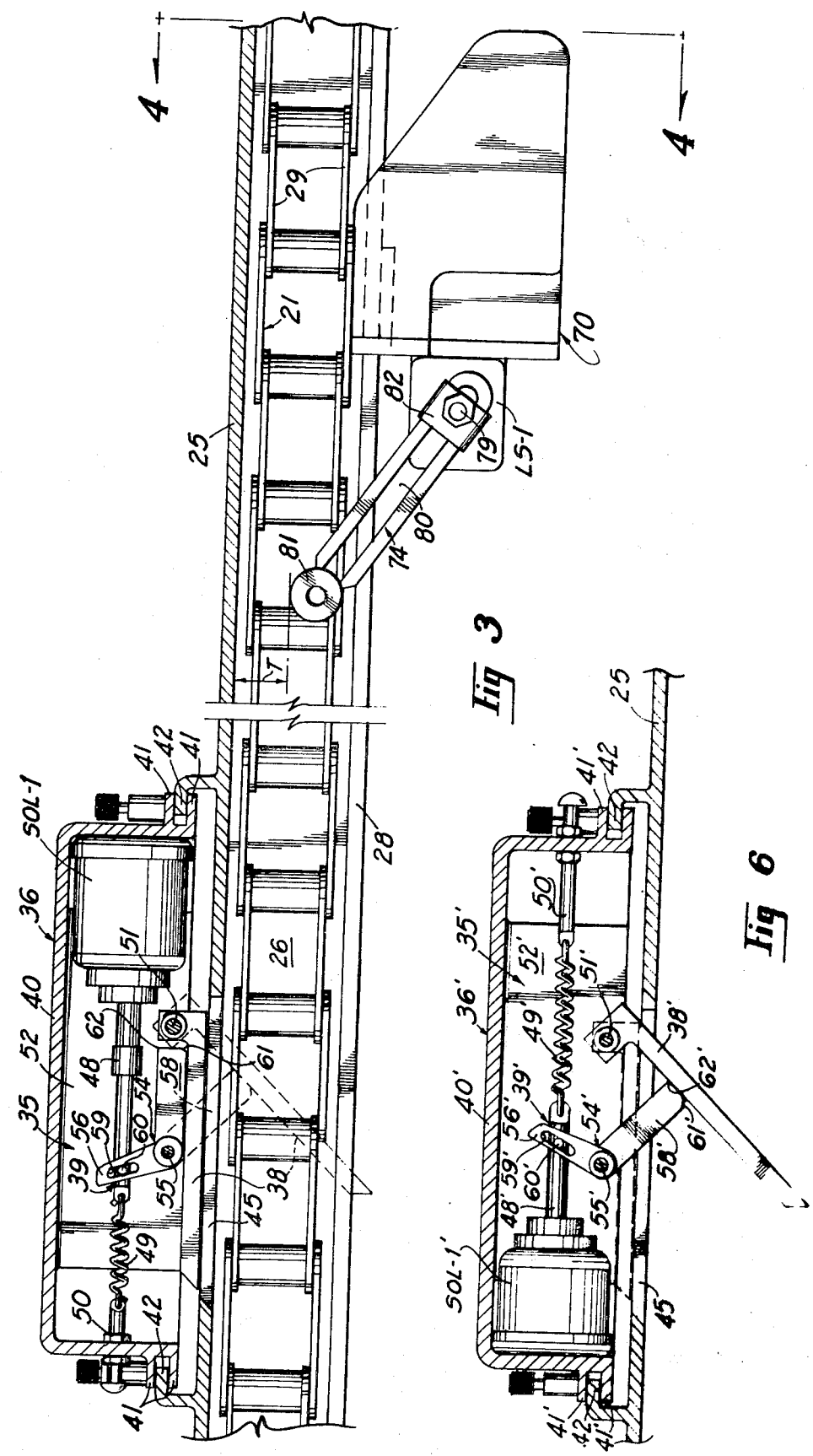

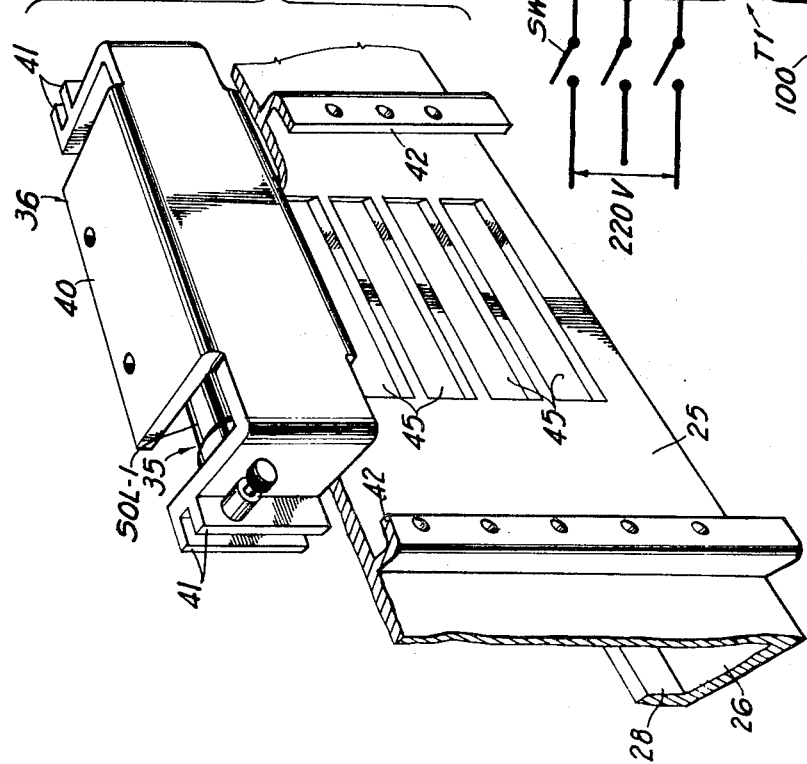
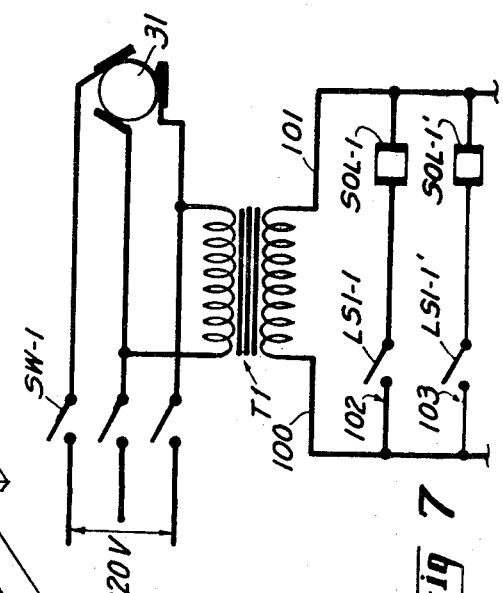

LUMBER SORTER

BACKGROUND OF THE INVENTION

Numerous devices for sorting lumber according to a predetermined dimension are available on the market today. These devices do not, however, offer the desired flexibility to sort lumber according to length, thickness, width, or any combination thereof without substantial modification to change form one dimension to another. Thus, these devices were expensive to change for each sorting operation a required almost constant attention to maintain the devices in proper adjustment.

SUMMARY OF THE INVENTION

These and other limitations and disadvantages associated with the prior art are overcome by the invention disclosed herein in that sufficient flexibility is provided for sorting lumber according to length, thickness, width, or any combination thereof, as desired without any structural modification.

OBJECTS OF THE INVENTION

It is therefore a primary object of the invention to provide a system for separating lumber which includes means for separating lumber according to any predetermined length, width, thickness, or any combination thereof.

A further object of this invention is to provide a system for separating lumber according to a predetermined dimension or dimensions at any one of a plurality of separating stations utilizing the same conveying means.

A still further object of this invention is to provide system for separating lumber according to a predetermined dimension or dimensions including adjustably supported sensing means for varying the sensing position of said sensing means relative to said conveying means.

An additional object of this invention is to provide a system for separating lumber according to predetermined dimensions at a plurality of receiving stations with said system capable of beginning with either a larger or smaller dimension and separating, decreasingly or increasingly, to a smaller or larger dimension, respectively.

Another object of this invention is to provide a system for separating lumber according to predetermined dimensions including a plurality of electromagnetically actuated lumber-ejecting means with independent sensing circuit control means operatively associated with each ejecting means.

A still further object of this invention is to provide ejector means adjustably positioned with respect to the lumber passing thereby to separate lumber according to width.

A further object of this invention is to provide a system for separating lumber according to predetermined dimensions which is economical to manufacture, simple in construction and operation, and reliable in performance.

The apparatus of the invention comprises generally a conveyor for moving lumber along a prescribed path on its edge; sensing means for sensing the desired dimension of the lumber for which the lumber is to be separated; and ejection means for selectively discharging the lumber from the path operatively associated with the sensing means. The sensing means is adjustable with respect to the path to allow different dimensions such as length, or thickness to be sensed and cause the ejection means to discharge the lumber accordingly. The ejection means is adjustable to allow different widths of lumber to be separated. The sensing means is electrically connected to the ejection means to provide easy system changes by changing the connections.

Still other objects and advantages will become apparent in the details of construction of the illustrative embodiment of the invention as set forth in the following specification and as illustrated in the accompanying drawings wherein like characters or references designate corresponding parts throughout the several views and in which:

BRIEF DESCRIPTION OF THE DRAWINGS

FIG. 2 is a foreshortened side view of one of the separating stations;

FIG. 3 is a top view of FIG. 2;

FIG. 4 is a cross-sectional view taken along line 4—4 in FIG. 3;

FIG. 5 is a rear exploded perspective view of the ejection means;

FIG. 6 is a view similar to FIG. 3 illustrating a second embodiment of the ejection means; and, FIG. 7 is an electrical schematic drawing for the controls of both embodiments of the invention.

Figure 1:
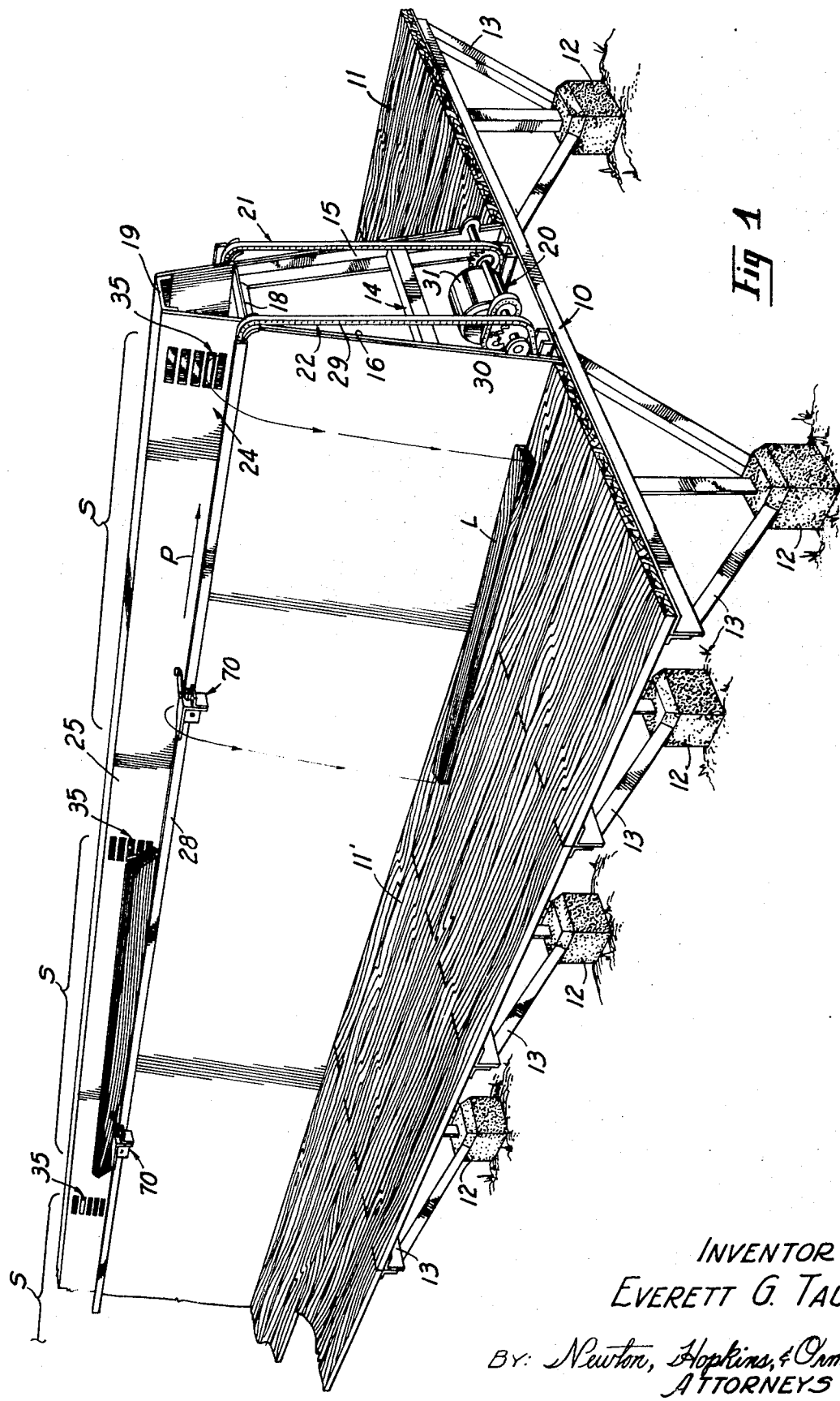
FIG. 1 is a perspective view of a lumber-separating system in accordance with the invention.

These figures and the following detailed description disclose specific embodiments of the invention, however, it is to be understood that the inventive concept is not limited thereto since it may be embodied in other forms.

DESCRIPTION OF ILLUSTRATIVE EMBODIMENTS

The illustrative embodiment of the lumber-separating system will be described with reference to a main support frame 10 (FIG. 1), a conveying mechanism 20 (FIGS. 4 and 7), a lumber ejector means 35, (FIGS. 1–4, and 7), and a sensing means 70 (FIGS. 1–4, and 7).

MAIN SUPPORT FRAME.

Referring to FIG. 1, it will be seen that the main support frame 10 mounts the conveying mechanism 20, lumber ejector means 35 and sensing means 70 thereon. The frame 10 includes a plurality of undercarriages 13 mounted on foundations 12. Centrally mounted on each undercarriage 13 is an upstanding A-shaped subframe 14 (only one of which is shown.) The undercarriages 13 mount landing or accumulating tables 11, 11', on each side of subframes 14 and subframes 14 mount the conveyor mechanism 20, ejector means 35, and sensing means 70 along the upper ends thereof. The landing tables 11, 11', extend along the length of the system and are generally horizontally oriented. Each subframe 14 includes a pair of upstanding braces 15, 16, angled toward each other and joined at their upper ends by a crossmember 18.

CONVEYING MECHANISM

The conveying mechanism 20, as seen in FIG. 1, is carried by the upper ends of A-shaped subframes 14 on crossmembers 18 and extends along the length of the system above and between the tables 11, 11'. The conveying mechanism 20 includes a first conveyor 21 and a second conveyor 22. The first conveyor 21 is mounted along the right-hand ends of member 18 as seen in FIG. 1 and the second conveyor 22 is mounted along the left-hand ends of members 18 as seen in FIG. 1, and positioned by carriage 19. The lumber carried by conveyor 21 will be discharged onto the right-hand landing table 11 and the lumber carried by the conveyor 22 will be discharged onto the left-hand landing table 11'. Since conveyors 21 and 22 are mirror images of each other, only the left conveyor 22 will be described in detail with primes of the reference numerals applied to conveyor 22 being applied to corresponding parts of conveyor 21.

Conveyor 22 includes a J-shaped trough 24 (FIGS. 1 and 4) extending along the length of the system having a long upright leg 25, a short support leg 26 integral with leg 25 along one edge thereof (FIG. 4), and an upstanding retaining flange 28 integral with the opposite edge of leg 26. Trough 24 is inclined away from the vertical slightly as seen in FIG. 4, so that a piece of lumber L standing on its edge will rest against leg 25 in a substantially vertical position.

An endless conveyor chain 29 carried by sprockets 30 is provided which has its upper flight slidably supported by leg 26 of member 24 and retained on leg 26 by leg 25 and flange 28. Chain 29 is driven by motor 31 through one of the sprockets 30. The chain 29 is thick enough so that the upper surface of the upper flight thereof is higher than the upper edge of flange 28. The lower edge of lumber L rests on top of the upper flight of chain 29 as seen in FIGS. 1 and 4, and is moved along path P on trough 24 under the frictional contact between chain 29 and lumber L. If a more positive driving force is needed, then appropriate lugs (not shown) could be installed on chain 29. When the lumber L is to be discharged from chain 29 and trough 24, it is tilted over by the ejector means 35 and pivots sidewise off of chain 29 over flange 28 and falls on table 11.

LUMBER EJECTOR MEANS

The plurality of lumber ejection means 35 are associated with each conveyor 21 and 22, and are longitudinally spaced along the conveyors, one means 35 being associated with each separating or classification station S as seen in FIG. 1. All of the ejection means 35 are identical in construction and one such means is shown in FIGS. 2, 3, and 5. Each ejection means 35 carried by the long upright leg 25 of the trough 20 or 24' and are adjustably spaced above the upper flight of the conveyor chains 29 or 29' to selectively engage the lumber L carried along trough 24 or 24' adjacent its upper edge and pivot the lumber L over so that its center of gravity is outboard of the flange 28 to cause the lumber L to pivot from the conveyor 21 or 22 onto landing table 11 or 11'. Therefore, it will be seen that the particular lumber being separated by the ejector means 35 will engage same above its center of gravity and preferably adjacent its upper edge.

As seen in FIGS. 2, 3, and 5, the ejection means 35 includes a housing 36, a solenoid SOL-1, an ejector arm 38 and a camming arrangement 39 connecting the arm 38 with solenoid SOL-1. The housing 36 includes a U-shaped bracket 40 having a pair of parallel, outwardly extending, spaced flanges 41 across each end thereof. These flanges 41 fit about spaced, parallel, vertically extending lips 42 on the back side of the leg 25 of trough 24 or 24' to mount the ejector means 35. An appropriate spring-loaded plunger 44 is provided through one of the flanges 41 at each end of housing 36 to fixedly yet releasably attach the ejection means 35 along lips 42 by engaging locking holes 43 in lips 42 (FIG. 5). Let 25 defines a plurality of vertically spaced openings 45 therethrough as best seen in FIGS. 1-3 and 5, through which ejector arm 38 extends over path P along which the lumber L is moved to separate the lumber L. That portion 46 of leg 25 between the openings 45 allows the lumber L to pass thereby when the ejector arm 38 is retracted. The solenoid SOL-1 is attached to one end of housing 36 with its plunger 48 extending toward the other end thereof and is attached thereto by a spring 49 and tension adjuster 50. The spring 49 urges the plunger 48 toward its extended position and the solenoid SOL-1 retracts same against the spring tension when activated.

Ejector arm 38 is pivotally mounted between plunger 48 and leg 25 on shaft 51 carried by sideplates 52 of housing 36. When arm 38 is in its retracted position it is behind leg 25 and will not discharge lumber L moving along path P but when it is extended as shown in dashed lines in FIG. 3, it will discharge the lumber L. A bell crank 54 is pivotally mounted between plunger 48 and arm 38 by a shaft 55 carried between sideplates 52 and includes a driving leg 56 and a driven camming leg 58. Driving leg 56 includes a slot 59 therein which cooperates with a pin 60 in plunger 48 to cause leg 59 to extend and retract arm 38. Camming leg 58 defines a front camming surface 61 which engages the back of arm 38 and extends same through the opening 45 behind which it is positioned. Leg 58 also defines a rear camming surface 62 which engages a driving corner on arm 38 shaft 51 and returns the arm 38 from its extended to its retracted position as the bell crank 54 is retracted by plunger 48. Therefore, the solenoid SOL-1, when actuated, causes the arm 38 to be extended through opening 45 to its eject position and tilt lumber L passing along path P and cause the same to be discharged from conveyor 21 or 22.

The plurality of vertically aligned openings 45 permit vertical adjustment of the ejector means 35 so that only lumber L having a width greater than the distance between the top of conveyor 21 or 22 and the bottom of ejector are 38 will be ejected. This allows separation of the lumber according to width. Since it is necessary for arm 38 to be above the center of gravity of the lumber L, then each ejector means 35 can discharge lumber L which will be engaged by arm 38 between its center of gravity and its upper edge. If each station were to separate only one specific width, then only one opening 45 would be provided and the ejection means 35 would be fixed behind the opening 45.

SENSING MEANS

As best seen in FIGS. 1-4, each separator station S includes a sensing means 70 carried on the retaining flange 28 of the J-shaped member 24 or 24'. The sensing means 70 includes a support bracket 71, a limit switch LS1 and an operator arm 74. The bracket 71 includes an overhanging lip 75 as best seen in FIG. 4, which slidably fits over flange 28 to mount bracket 71. Setscrews 76 are provided in bracket 71 to engage flange 28 and lock the bracket 71 in position at any desired location along flange 28. A deflection plate 77 is mounted on top of bracket 71 and extends over the upper edge of flange 28 to help maintain the lumber L passing thereby on conveyor 21 or 22 in position against leg 25 of the J-shaped member 24 or 24'. A depending mounting plate 78 is provided on bracket 71 to mount limit switch LS1.

The limit switch LS1 is of conventional construction and has normally open contacts LS1-1 as seen in FIG. 7. It is mounted on plate 78 so that its actuation shaft 79 is substantially vertical and adjacent flange 28. The shaft 79 is spring urged toward its normal position and mounts at its upper end operator arm 74 so that it extends over flange 28 into the path P. Arm 74 is slotted as at 80 and carries a cam wheel 81 at its extending end. The arm 74 fits on shaft 79 through slot 80 and is held there by a clamp 82. The slot 80 allows arm 74 to be slidably adjustable with respect to shaft 79 so that the distance T as seen in FIG. 3 between wheel 81 and leg 25 can be selectively varied to accommodate different thicknesses of lumber L therebetween before activation of switch LS1. The bracket 71 allows the distance between the ejection means 35 and sensing means 70 at that particular station S to be selectively varied to accommodate different lengths of lumber L.

Referring to FIG. 7, it will be seen that the circuit for the device includes a power switch SW-1 connecting the motor 31 to a 220-volt power source. A stepdown transformer T1 connected to the power source through switch SW-1 supplies 110 volts to hot wire 100 and ground 101. For illustration only, one circuit branch 102 associated with one station S is shown for the first embodiment of the invention described hereinabove, it being understood that there would be a separate circuit branch 102 associated with each station S connected in parallel between wires 100 and 101. The circuit branch 102 includes the contacts LS1-1 in series with solenoid SOL-1. When contacts LS1-1 are closed by the lumber L engaging cam wheel 81, solenoid SOL-1 will be activated to extend arm 38 to its discharge position.

The first embodiment of the invention is designed to separate lumber according to length, width, thickness or any combination of these dimensions starting with the longest, widest and thickest lumber first and progressing to the shortest, narrowest and thinnest. The length is determined by the distance between the ejection means 35 and the sensing means 70, the thickness is determined by the distance T between cam wheel 81 and leg 25; and the width is determined by the height of ejector arm 38 above the top of chain 29.

The system may be easily modified to separate the lumber starting with the shortest, thinnest, and narrowest first and progressing to the longest, thickest and widest. The modification is shown as a second embodiment of the ejection means in FIG. 7 and referenced by the numeral 35'. The components of the means 35' are the same as the means 35 and corresponding parts are referenced by primes of the reference numerals applied to the means 35. The relative position of the bellcrank 54' and ejector arm 38' remain the same, but the position of solenoid SOL–1' and its associated plunger 48', spring 49' and tension adjuster 50' have been reversed so that the spring 49' and tension adjuster 50' have been reversed so that the spring 49' urges the arm 38' into its extended or discharging position and the solenoid SOL–1' urges same to its retracted position. Thus, when contacts LS1–1 in circuit branch 103 of FIG. 7 are closed arm 38' will be retracted by solenoid SOL–1' to allow the lumber L to pass thereby. It will be seen then that when the lumber L activates contacts LS1–1', the lumber L is allowed to pass the ejector means 35' rather than be ejected as with the first embodiment of the invention.

OPERATION

In operation it will be seen that the first embodiment of the invention is set up to separate longest, widest, and thickest first and progress to the shortest, narrowest and thinnest last. FIG. 1 shows the last two stations S of the invention, however, it is to be understood that there will be as many stations S as there are different separations of lumber L. The distance between the ejection means 35 and sensing means 70 is adjusted at each station S by sliding the sensing means 70 along the flange 28 to the desired position and locking the means 70 to flange 28 by bolts 76 (See FIGS. 2 and 4). This adjusts each station S for length of lumber L to be separated thereat. Next, the operating arm 74 is adjusted through clamp 82 to obtain the desired distance T (See FIG. 2) between wheel 81 and leg 25. This adjusts each station S for the thickness of lumber L to be separated thereat. The vertical position along leg 25 of ejector means 35 is adjusted by manipulating plungers 44 to obtain the desired distance W between the top of ejector arm 38 and the top of the upper flight of chain 29 (See FIG. 2). This adjusts each station S for the width of the lumber L to be separated thereat. Thus, it will be seen that lumber can be sorted at each station according to all of its dimensions, length, width, and thickness, at the same time.

If it is desirable to sort the lumber according to less than all of its dimensions, then the system can be appropriately adjusted to sort according to length or width or thickness individually or any combination thereof. This can be accomplished by setting that portion of the system associated with that dimension which is not being used for sorting so that it will be engaged or activated by every piece of lumber passing thereby.

When all dimensions are being used for sorting with the first embodiment of the system, each piece of lumber L moving along path P closes switch LS1–1 if it is thick enough to engage wheel 81. This activates solenoid SOL–1 of that station S to extend ejector arm 38. If the lumber is too thin, then it fails to close LS1–1. Thus, each piece of lumber will be checked for thickness in this manner at each station S.

If the lumber is long enough to reach between sensing means 70 and ejector arm 38, then the lumber L will be ejected because the arm 38 is extended when the lumber L reaches same. If it is too short, then wheel 81 will be released before the lumber L reaches arm 38 and solenoid SOL–1 will be deenergized when switch LS1–1 associated therewith is opened to retract arm 38 so as not to discharge the lumber L at that particular station S. Thus, each piece of lumber L will be checked for length at each station S.

If the lumber L is sufficiently wide and the arm 38 is extended, the arm 38 will engage the lumber L as it passes thereby and tip the top of same away from leg 25 so that its center of gravity is outboard of the trough 24. This causes the lumber to pivot off of the conveyor and fall onto the appropriate landing table. If, however, the lumber is not wide enough to be engaged by arm 38, then it will pass thereunder and not be discharged even though the arm 38 is extended. Thus, each piece of lumber is also checked for width at each station S.

The only difference in the operation of the first embodiment of invention and the second embodiment is that lumber L is separated shortest, thinnest, narrowest first and progressing to longest, thickest, last. This is because arm 38' is normally extended to discharge the lumber L and is retracted only when switch LS1 is closed to allow the lumber to pass thereby. Thus, it will be seen that when contacts LSL–1' are closed, the arm 38 will be retracted to allow the lumber L to pass thereby without being rejected.

When less than all of the dimensions are to be used for sorting, the appropriate adjustment is made so that that component of the system which senses for the omitted dimension will be rendered ineffective. For instance, if the width is the omitted dimension, then the height of arm 38 above the chain 29 is set so that the arm, when extended, will engage each piece of lumber L passing thereby. On the other hand, if the thickness is the omitted dimension, then the distance T between wheel 81 and leg 25 is set so that each piece of lumber L passing thereby will engage wheel 81 to activate switch LS1. If the length is the omitted dimension, then the distance between the ejection means 35 and sensing means 70 is set shorter than any piece of lumber L to be separated. Therefore, it will be seen that the system is highly versatile and can be used to sort lumber according to each of its dimensions in any combination.

It is to be further understood that the ejector means 35 or 35' may be pneumatically connected to the sensing means by replacing the solenoid SOL–1 or SOL–1' with a pneumatic cylinder and by replacing switch LS–with a pilot valve. Switch LS–1 may also be replaced by a magnetic proximity switch or a photoelectric switch assembly. The operation of the invention would not be altered using these modifications.

While specific embodiments of the invention have been set forth herein, it is to be understood that substitutions, modifications, or equivalents may be used without departing from the scope of the inventive concept.

What is claimed as invention:

1. A lumber-sorting apparatus for separating lumber according to size comprising means for moving the lumber lengthwise and on edge along a prescribed path, a guide member extending along one edge of said path and adapted to engage and guide lumber moving along said path, an ejector device mounted for vertical adjustment on said guide member, means for fixing said ejector device in a selected vertical position, said ejector device comprising an ejector element movable horizontally across said path to engage and eject a piece of lumber if said lumber is of sufficient width to extend to the height at which said ejector element has been fixed, a sensor device mounted for longitudinal adjustment along the edge of said prescribed path opposite said guide member, means for fixing said sensor device in a selected longitudinal position, said sensor device comprising a sensor element adjustably mounted for movement to a predetermined position in which it extends part way across the path so that it will engage a piece of lumber moving along said path if the thickness of said lumber is at least as great as the distance between said sensor element and the guide member, means for fixing said sensor element in said predetermined position and operative connection means so arranged as to cause the ejector element to be actuated when said sensor element is engaged by a piece of lumber.

2. A lumber-sorting apparatus as in claim 1, wherein said guide member is provided with a plurality of vertically spaced longitudinally extending slots of a size to permit passage of said ejector element therethrough and said ejector device is slidably mounted on vertical guides on said guide member, and wherein means are provided for selectively fixing said ejector device in position with the selector element opposite a predetermined slot.

3. A lumber-sorting apparatus as in claim 2, wherein the mounting of said sensor element comprises an arm pivotally mounted on said sensor device with its outer end swingable over said prescribed path and means for adjusting the distance between the outer end of said arm and its pivot.

4. A lumber-sorting apparatus as in claim 3, wherein said pivotal connection comprises a rotatable shaft and said arm comprises a longitudinally extending slot in which said shaft is received, and wherein a clamping means is provided for fixing said arm to said shaft with the shaft positioned at a selected position along said slot.

5. A lumber-sorting apparatus as in claim 4, wherein said sensor element comprises a wheel mounted on the outer end of said arm.

* * * * *